Patented May 30, 1950

2,510,008

UNITED STATES PATENT OFFICE 2,510,008

PROPYLENE GLYCOL MONOARYL ETHER-ESTERS OF SULFOSUCCINIC ACID

Edgar C. Britton and Robert L. Brown, Midland, Mich., assignors to The Dow Chemical Company, Midland, Mich., a corporation of Delaware No Drawing. Application April 1, 1948,
Serial No. 18,478

4 Claims. (Cl. 260—481)

This invention concerns new ether-esters of sulfosuccinic acid. It pertains especially to propylene glycol monoaryl ether-esters of sulfosuccinic acid and more particularly to the alkali metal salts of such esters.

The new ether-esters of sulfosuccinic acid are valuable detergents and emulsifying agents, particularly when employed in the form of their alkali metal salts, by reason of their extraordinary wetting powers in aqueous solution. The compounds form unusually stable emulsions in acid and alkaline aqueous media. They are soluble in water and also organic solvents such as benzene, toluene, ethylene dichloride, isopropyl alcohol, methyl ethyl ketone, or the like, and readily form emulsions or colloidal suspensions in various liquids.

We have found, surprisingly, that the alkali metal salts, more particularly the sodium and potassium salts of the sulfosuccinic acid esters of propeylene glycol chloro-substituted monophenyl ethers, wherein a chlorine atom is substituted in the para position, are exceptionally stable emulsifying agents in both acid and alkaline media. The sodium or potassium salts of sulfosuccinic acid esters of propylene glycol 4-chlorophenyl ether, and similar salts of sulfosuccinic acid esters of propylene glycol 2,4-dichlorophenyl ether, are particularly suitable for use in acid or alkaline emulsion processes, e. g. the polymerization of vinyl compounds.

We have further found that the alkali metal salts of monosulfosuccinic acid esters of propylene glycol chloro-substituted phenyl ethers having a chlorine atom in the para position, e. g. bis-(propylene glycol 2,4-dichlorophenyl ether)-sodium sulfosuccinate, are extremely stable against hydrolysis in aqueous acid solutions. By reason of this unusual stability and their emulsifying properties, the compounds are particularly valuable as emulsifying agents in the emulsion polymerization of vinyl and vinylidene compounds employing methods such as those described in U. S. Patents 2,333,633 and 2,333,634.

It is an object of the invention to provide new propylene glycol aryl ether-esters of sulfosuccinic acid in the form of their alkali metal salts. Another object is to provide a method of making alkali metal salts of such new ether-esters of sulfosuccinic acid suitable for use as emulsifying agents. Still another object is to provide alkali metal salts of chloroaryloxy aliphatic esters of sulfosuccinic acid having improved wetting and emulsifying properties and which may be employed in either acid or alkaline aqueous media. Other and related objects will be apparent as the invention is described more particularly hereinafter.

The new compounds may be prepared by first esterifying the corresponding unsaturated acid, e. g. fumaric acid, maleic acid, or their anhydrides, and thereafter adding a bisulfite to the unsaturated ester. The unsaturated esters may advantageously be prepared in accordance with procedure similar to that disclosed in U. S. Patent 2,394,512 by reacting maleic acid with a propylene glycol monoaryl ether having the formula:

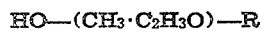

HO—(CH₃·C₂H₃O)—R wherein R represents a phenyl radical or a chloro-substituted phenyl radical containing not more than three chlorine atoms attached to carbon atoms of the benzene nucleus.

The unsaturated esters are converted to the corresponding alkali metal sulfosuccinic acid esters by treatment with an alkali metal bisulfite, e. g. NaHSO₃ or KHSO₃, preferably under pressure. The reaction may be carried out in the presence of a solvent or a diluent such as water or a mixture of water and a lower aliphatic alcohol, e. g. methanol, ethanol, isopropanol, etc. The water and alcohol are preferably employed in proportions of from 4 to 9 parts by weight of the alcohol per part of water although other proportions may be used, if desired. The water is usually employed in amount sufficient to form with the bisulfite reactant, a solution containing from 40 to 60 per cent by weight of the bisulfite.

Formation of the alkali metal sulfosuccinic acid ester is carried out by reacting the corresponding unsaturated ester, e. g. maleic acid ester, with sodium or potassium bisulfite at temperatures between 40° C. and 120° C., preferably 90° C. to 110° C. The reaction is preferably carried out employing an excess of the bisulfite compound over that required by theory. Most satisfactory results are obtained when the reactants are employed in proportions of from 1.25 to 2.5 mols of bisulfite per mol of the unsaturated ester. The reaction is usually complete in from 2 to 24 hours depending upon the proportions of reactants used and the temperature employed. At temperatures of 90° C. to 110° C., reaction is usually complete in from 2 to 4 hours. The reaction product is dried and then dispersed or dissolved in a solvent such as benzene, toluene, alcohol, or the like, to dissolve the sulfosuccinic acid ester sodium or potassium salt and the mixture filtered to remove insoluble products. The organic solvent is then removed, by drying or evaporating at atmospheric pressure or in vacuum, to obtain the sulfosuccinic acid ester alkali metal salt in purified form.

The following examples illustrate practice of the invention but are not to be construed as limiting the scope thereof:

Example 1

38.4 grams (0.1 mol) of bis-(propylene glycol phenyl ether)-maleate, 22.0 grams (0.21 mol) of sodium bisulfite, 15.0 grams of water and 100 milliliters of methyl alcohol were mixed and sealed in a glass reactor. The mixture was heated with agitation at a temperature of 95° to 97° C. for 3 hours. The reaction products were cooled, removed and dried. Excess sodium bisulfite was separated by treating the reaction product with benzene and filtering off the inorganic material. The filtrate was evaporated to obtain substantially pure bis-(propylene glycol phenyl ether)-sodium sulfosuccinate as a light-colored pasty solid. The product is soluble in water, benzene, toluene and isopropyl alcohol. It forms clear solutions with water and is an excellent detergent and emulsifying agent.

Example 2

45.3 grams (0.1 mol) of bis-(propylene glycol 4-chlorophenyl ether)-maleate, 22.0 grams (0.21 mol) of sodium bisulfite, 25.0 grams of water and 100 milliliters of anhydrous isopropyl alcohol were sealed in a glass pressure bottle and heated with agitation at a temperature of 95° to 97° C. for 4 hours. The reaction products were removed from the bottle, evaporated to dryness, and separated from excess sodium bisulfite by dissolving in benzene, filtering and evaporating the filtrate. There was obtained 54.5 grams (0.097 mol) of bis-(propylene glycol 4-chlorophenyl ether)-sodium sulfosuccinate having the formula:

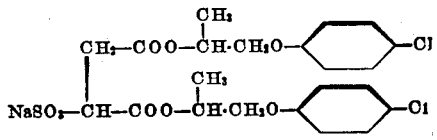

The product is an opaque white solid that can readily be ground to a powder. It is an excellent wetting and emulsifying agent and is suitable for use in both acid and alkaline aqueous emulsion polymerization processes.

Example 3

59.1 grams (0.1 mol) of bis-(propylene glycol 2,4,6-trichlorophenyl ether)-maleate, 22.0 grams (0.21 mol) of sodium bisulfite, 15 grams of water and 100 milliliters of isopropyl alcohol were sealed in a glass reactor and heated 5 hours at 95° C. with agitation. The product was purified by procedure similar to that described in Example 2. There was obtained bis-(propylene glycol, 2,4,6-trichlorophenyl ether)-sodium sulfosuccinate, as a white, soap-like solid. The product is an excellent detergent and is suitable as an emulsifying agent.

Example 4

52.2 grams (0.1 mol) of bis-(propylene glycol 2,4-dichlorophenyl ether)-maleate, 22.0 grams (0.21 mol) of sodium bisulfite, 25 grams of water and 100 milliliters of anhydrous isopropyl alcohol were sealed in a glass pressure bottle and heated with agitation at a temperature of 95° to 97° C. for 4 hours. The reaction products were cooled, removed and dried. The product was purified by dissolving in benzene, filtering and evaporating the filtrate. There was obtained 55.5 grams (0.0887 mol) of bis-(propylene glycol 2,4-dichlorophenyl ether)-sodium sulfosuccinate having the formula:

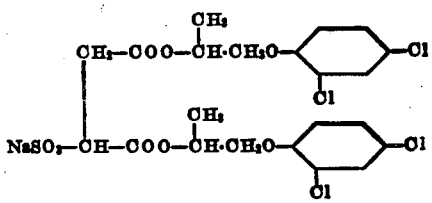

The product is a white solid that can readily be ground to a powder and is soluble in water, benzene, toluene, or alcohol. It is an excellent wetting and emulsifying agent and is extremely resistant to hydrolysis in both acid and alkaline aqueous emulsions.

Example 5

52.2 grams (0.1 mol) of bis-(propylene glycol 2,4-dichlorophenyl ether)-maleate, 13.0 grams (0.125 mol) of sodium bisulfite, 25 grams of water and 100 milliliters of anhydrous ispropyl alcohol were reacted and purified by procedure similar to that described in Example 4. There was obtained bis-(propylene glycol 2,4-dichlorophenyl ether)-sodium sulfosuccinate.

Other modes of applying the principle of our invention may be employed instead of those explained, change being made as regards the method or products herein disclosed, provided the steps or products stated in any of the following claims or the equivalent of such stated steps or products be employed.

We therefore particularly point out and distinctly claim as our invention:

1. As a new compound an alkali metal salt of a sulfosuccinic acid di-ester of an ether-alcohol selected from the group consisting of propylene glycol phenyl ether, propylene glycol 4-chlorophenyl ether, propylene glycol 2,4-dichlorophenyl ether and propylene glycol 2,4,6-trichlorophenyl ether.

2. As a new compound bis-(propylene glycol 4-chlorophenyl ether)-sodium sulfosuccinate having the formula:

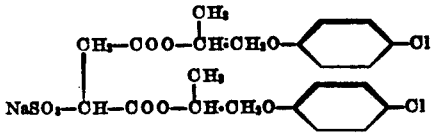

3. As a new compound bis-(propylene glycol 2,4-dichlorophenyl ether)-sodium sulfosuccinate having the formula:

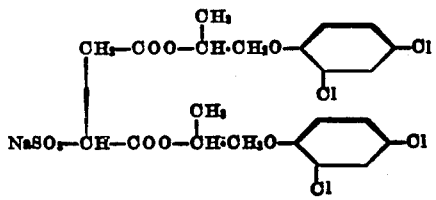

4. As a new compound bis-(propylene glycol 2,4,6-trichlorophenyl ether)-sodium sulfosuccinate having the formula:
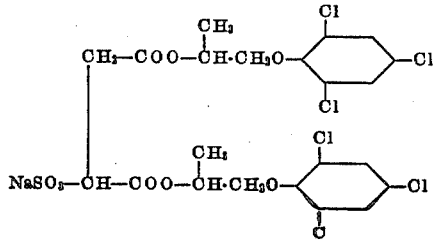
EDGAR C. BRITTON.
ROBERT L. BROWN.
REFERENCES CITED
The following references are of record in the file of this patent:
UNITED STATES PATENTS
| Number | Name | Date |
| --- | --- | --- |
| 2,028,091 | Jaeger | Jan. 14, 1936 |
| 2,386,445 | De Groote | Oct. 9, 1945 |
| 2,414,015 | Carver | Jan. 7, 1947 |
| 2,415,255 | Lynch | Feb. 4, 1947 |